R. E. JEFFERY.
DEMOUNTABLE RIM.
APPLICATION FILED MAR. 29, 1911.
1,025,528.
Patented May 7, 1912.
3 SHEETS—SHEET 1.
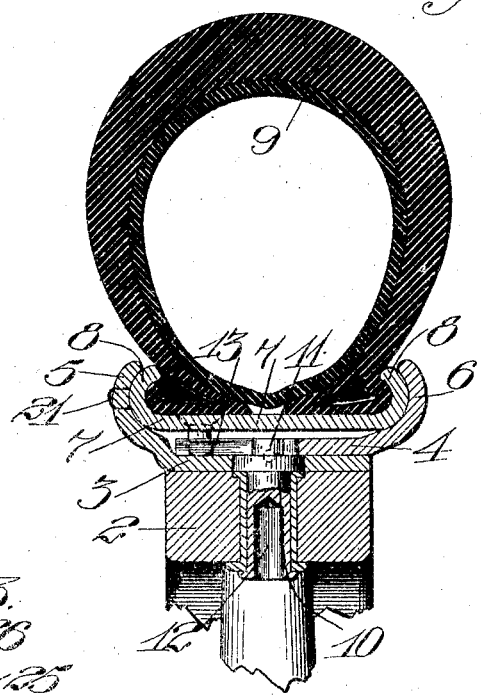
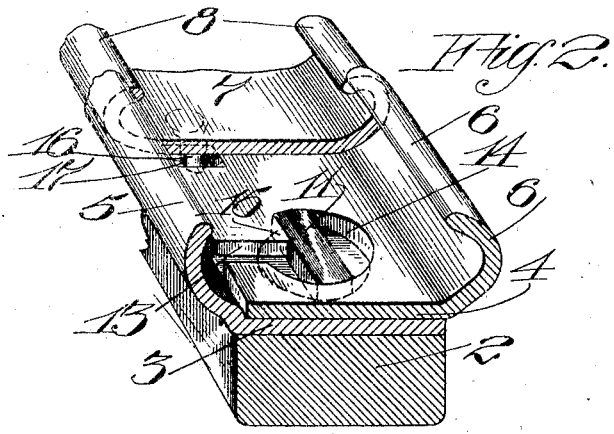
Witnesses
Thos. Castberg
F. E. Maynard.
Inventor
Richard E. Jeffery
by G. H. Strong
his Atty.

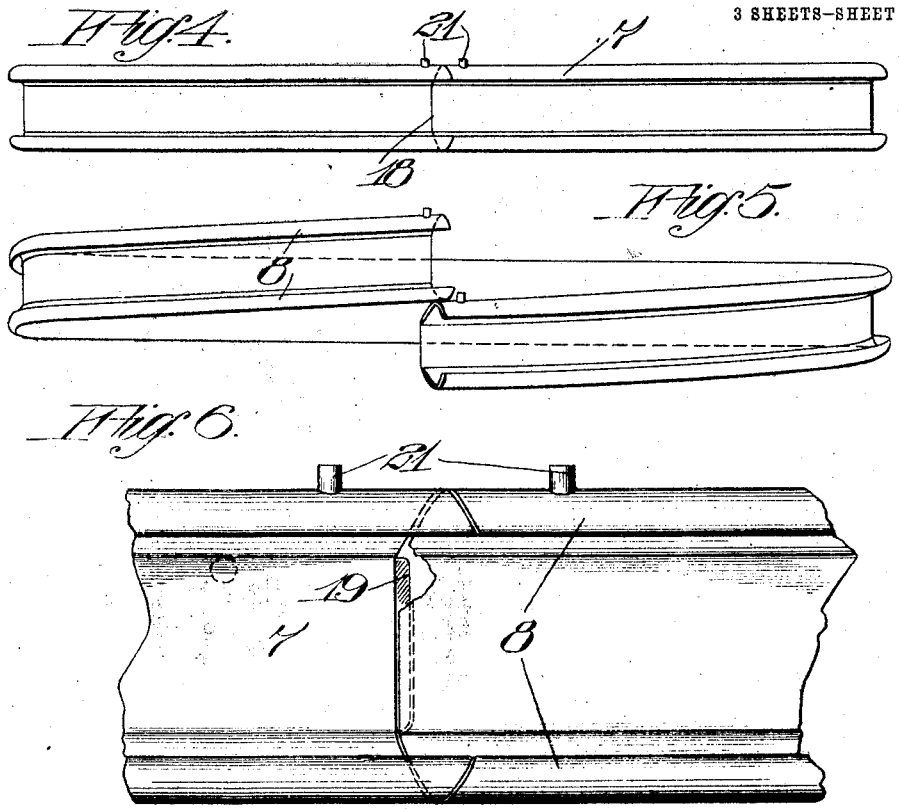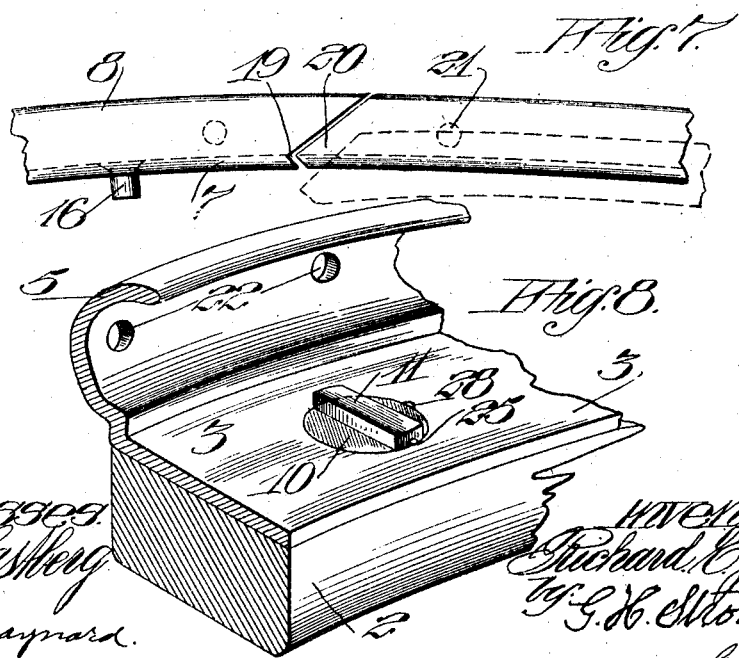

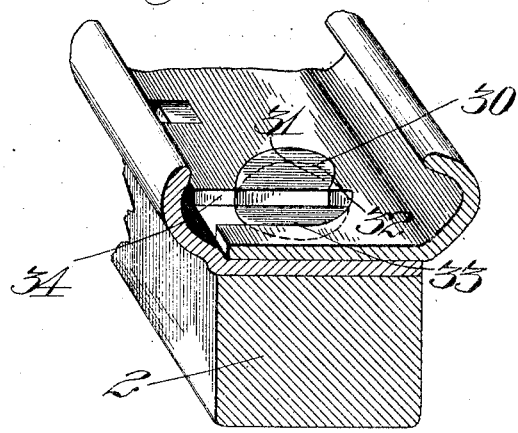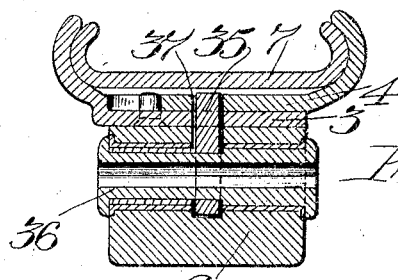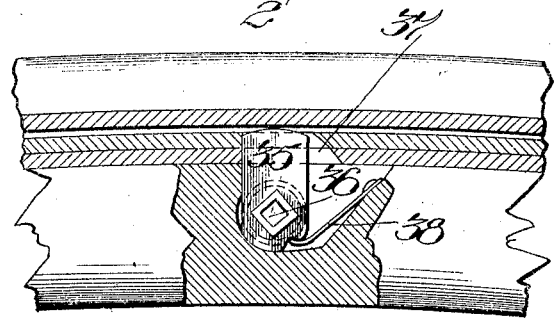

UNITED STATES PATENT OFFICE.

RICHARD E. JEFFERY, OF PIEDMONT, CALIFORNIA.

DEMOUNTABLE RIM.

1,025,528. Specification of Letters Patent. Patented May 7, 1912.

Application filed March 29, 1911. Serial No. 617,677.

*To all whom it may concern:*

Be it known that I, RICHARD E. JEFFERY, citizen of the United States, residing at Piedmont, in the county of Alameda and State of California, have invented new and useful Improvements in Demountable Rims, of which the following is a specification.

This invention relates to vehicle wheels, and particularly to a means for attaching tires thereto.

The object of the present invention is to provide a means for attaching tires to vehicle wheels so that they may be readily, easily and quickly mounted thereon and demounted therefrom; to provide a sectional rim and a demountable rim in combination whereby inflatable or other tires can be removed bodily from the wheel and placed thereon after the tire has been expanded in the event the latter is a pneumatic tire; and also to provide a means for securely locking the demountable and sectional rim members in position upon the felly of a wheel, said means being easily operated and inexpensive in construction; also to provide means for readily putting on or taking a tire off the demountable rim.

The invention consists of the parts and the combination and construction of parts as hereinafter more fully described and claimed, having reference to the accompanying drawings, in which—

Figure 1 is a transverse section through the felly and tire supporting members of a wheel. Fig. 2 is a perspective view of a fragment of the felly and tire supporting members. Fig. 3 is a detail sectional view of the detachable rim lock. Fig. 4 is a plan view of the demountable ring. Fig. 5 is a plan view of the same, showing the ring in twisted relation. Fig. 6 is an enlarged detail view in plan of a portion of the split demountable ring. Fig. 7 is an edge view of the same. Fig. 8 is a detail perspective view showing the demountable rim-locking means and the fixed flange band. Fig. 9 is a perspective view of a modified form of rim locking device. Fig. 10 is a transverse sectional view showing another modified form of rim locking device. Fig. 11 is a sectional view in detail showing the locking device in elevation.

In the present embodiment of my invention, 2 represents a felly of a wheel, upon which is secured one portion 3 of a sectional rim; the other portion of which device is represented as a detachable rim section 4. The fixed section 3 has a lateral supporting flange 5; and 6 is a similar flange formed upon the detachable rim portion 4. The rim section 4 is adapted to telescope with and rest upon the periphery of the fixed section 3. The parts 3—4 when thus assembled in position upon the felly 2, are adapted to embrace between their opposite flanges 5 and 6, a demountable rim 7 in the form of a one-piece split ring, having upwardly curved flanges 8—8 upon each side for the purpose of retaining in position about the wheel a suitable tire 9.

Suitable locking means are provided whereby the detachable section 4 may be temporarily and firmly locked in position about the felly. In the present instance this locking device is represented as a key, consisting of a turnable bolt 10 Fig. 1, having formed at its upper end an expanded oblong head 11 which may be turned by a suitable tool or wrench, not shown, insertible in a polygonal socket 12 formed in the bolt 10. There may be a plurality of locking bolts 10 provided in the felly 2, and heads 11 which project above the flat portion of the section 3 are all turned transversely to the flat of the section 3 when it is desired to lock the detachable rim section 4 in position. To allow this assemblage of the members 3 and 4 the section 4 is transversely slotted at suitable points, as at 13, Fig. 2, the slots being of sufficient width to pass freely, longitudinally along the sides of the transversely turned heads 11 projecting above the face of the fixed section 3. When the detachable section 4 has been pushed fully into position over the section 3, there registers centrally with the upper portion of the bolt 10 a pocket 14 of almost circular shape formed at the inner end of each slot 13. Each pocket 14 is provided at one portion with an inwardly projecting shoulder 15 for the purpose to be described.

After the sections 3—4 have been assembled, the several bolts 10 are turned so that the heads 11 are adjusted in a peripheral line approximately with the center of the detachable section 4, and one end of each of the heads 11 abuts against the shoulder 15 formed in the section 4. By this means the rim section 4 is positively prevented from transversely moving upon the section 3, and in order to prevent circumferential movement of the detachable section 4 upon the part 3, there are provided at suitable points radial pins or lugs 16, rigidly secured in the section 3, or projecting from the felly 2. These projections 16 enter transversely formed openings or recesses 17 in the edge of the detachable section 4.

Before the detachable member 4 is adjusted in position upon the fixed section 3, the demountable rim 7, upon which the tire 9 may have been previously adjusted, is passed over the flat circumference of the section 3, but the interior diameter of the rim 7 is sufficiently greater than the external diameter of the section 3 to provide ample clearance into which may be passed the detachable section 4. Thus after the tire has been adjusted upon the demountable rim 7 and the latter placed over the section 3 so that one of the flanges 8 rests against the flange 5, the operator then passes the detachable section 4 into the space formed between the bottom of the rim 7 and the flat surface of the member 3 until the flange 6 firmly engages the outer flange 8 of the demountable rim 7, the detachable section 4 being firmly locked in position upon the fixed member 3 by turning the keys 11, as before described, until they are engaged by the shoulders 15. As stated, the circumferential movement of the detachable section 4 is prevented by the projections 16 engaging the walls of the recesses 17.

For the purpose of facilitating the application and adjustment of the tire 9 upon the demountable rim 7, the latter in peculiarly split transversely at a suitable point to allow the adjacent ends of the split rim to overlap, as clearly shown in Fig. 5, and permitting the tire 9 to be passed freely into position between the flanges 8. As seen in Fig. 7 the ends of the rim are cut transversely along two intersecting planes so as to form in effect a V-shaped tongue 20 on one end and a V-shaped groove or recess 19 in the other end.

When the tire has been fully adjusted upon the rim 7, the split ends are sprung together in circumferential alinement and are positively retained against radial displacement after the tire is inflated by the interlock provided by the tongue 20 and groove-like pocket or recess 19. When the tire 9 has been inflated, its compression upon the surface of the rim 7 causes the complementary projecting and recessed portions 20 and 19, respectively, to snugly abut and prevent slipping of the adjacent ends.

For the double purpose of preventing the ends of the rim 7 slipping radially and preventing circumferential movement of the demountable rim 7 between the flanges 5 and 6 of the supporting structure, there are provided a pair of laterally projecting studs 21, one at each end of and on the side of the rim 7 which are adapted to enter complementary recesses 22 in flange 5. If desired the inside of rim 7 adjacent the hub may have radial projections 23 to fit slots 24 in the flat portion of section 4. Side slip of the ends of the rim 7 is prevented of course by the flanges 5—6.

The unlocking of the ends of the split rim 7 may be facilitated by the insertion of a suitable tool, not shown, against the lugs 21 so as first to spread the adjacent ends of the rim 7 circumferentially as to readily clear the projecting edge of the V-shaped notch 19 then springing the ends radially as shown in dotted line Fig. 7. This will shorten the rim 7 so the tire can easily be taken off or put on.

Any simple or suitable means may be employed to lock the key 11 against accidential movement during the operation of the wheel, and I have shown in Fig. 3 a locking device comprising a ball or other equivalent device 25 mounted in a recess 26 formed for its reception in the body of the key 11, and in the recess 26 is mounted an expansible spring 27, normally tending to thrust the ball 25 outwardly so that when the key 11 is turned sufficiently the ball 25 will be projected into a pocket or nick 28 Fig. 8, formed for its reception in the wall of the perforation or opening 14 in the detachable rim section 4.

In Fig. 9 I have shown a modified form of locking key 30, which is in plan view substantially a semi-circle, but which has one corner removed, as at 31, permitting the engagement by the surface 31 of an inwardly projecting portion 32 on the detachable ring. In this form of locking key the device 31 is turned axially until its curved edge stands adjacent the portion 33 of an opening in the rim section 4, and the receiving slot 34 is sufficiently wide to allow the rim section 4 to be passed freely outwardly from the key 30.

In Figs. 10 and 11 a further modification of locking device is illustrated, which, in this instance comprises a plate 35 secured upon a transversely extending plug 36 mounted in the felly of the wheel. This plug 36 is centrally perforated to receive a polygonal wrench, not shown, by which the plug may be turned. The upper end of the plate or key 35 is turnable into a peripheral slot 37 formed in the detachable rim section, thus preventing transversal movement of the rim upon the band. When the key 35 has been turned upwardly to the position indicated in Fig. 11, a suitable spring or other appropriate device, as 38, normally retains the key in upturned position, thus preventing its accidental rotation and release of the rim from the wheel.

Having thus described my invention, what I claim and desire to secure by Letters Patent, is—

1. A tire-retaining device, comprising a wheel felly, a demountable rim and means for retaining said rim in adjusted position upon the wheel, said means including a two-part rim, one of which parts is removable and provided with key-receiving pockets with reduced slots leading therefrom, said pockets having internal shoulders, and keys adapted to pass through said slots and turnable in the pockets crosswise of the slots to lock the removable rim part in position.

2. A tire-retaining device, comprising a demountable rim adapted to receive a tire, and means whereby said rim may be demountably supported upon a wheel, said means including a detachable rim section having a flange on one side engageable with one side of the demountable rim, a fixed rim section supporting the other side of the demountable rim, and means whereby the demountable rim section may be firmly locked in position upon said fixed rim section, said last named means comprising keys having enlarged heads, said removable section having slots leading through one side and having enlarged openings at the inner ends of the slots whereby the keys upon entering the openings may be turned crosswise of the slots to lock said removable rim section in position.

3. In a vehicle wheel the combination with a felly, of a rim, a fixed section and a sidewise removable section telescoping and overlying a portion of the fixed section, means for holding said sections together, said means including turnable keys having laterally expanded heads having flattened sides, said heads projecting up through the fixed section fitting into corresponding pockets in the removable section, said pockets opening at one side of the removable section by slots sufficient to allow said head to pass, when turned in one direction, and said removable section having enlarged openings at the inner ends of the slots provided with shoulders for preventing the head from passing when the latter is turned in the other direction.

In testimony whereof I have hereunto set my hand in the presence of two subscribing witnesses.

RICHARD E. JEFFERY.

Witnesses:
 JOHN H. HERRING,
 CHARLES EDELMAN.